C. E. McCARREN.
POPCORN COATING DEVICE.
APPLICATION FILED MAY 1, 1915.
1,164,948.
Patented Dec. 21, 1915.
2 SHEETS—SHEET 1.
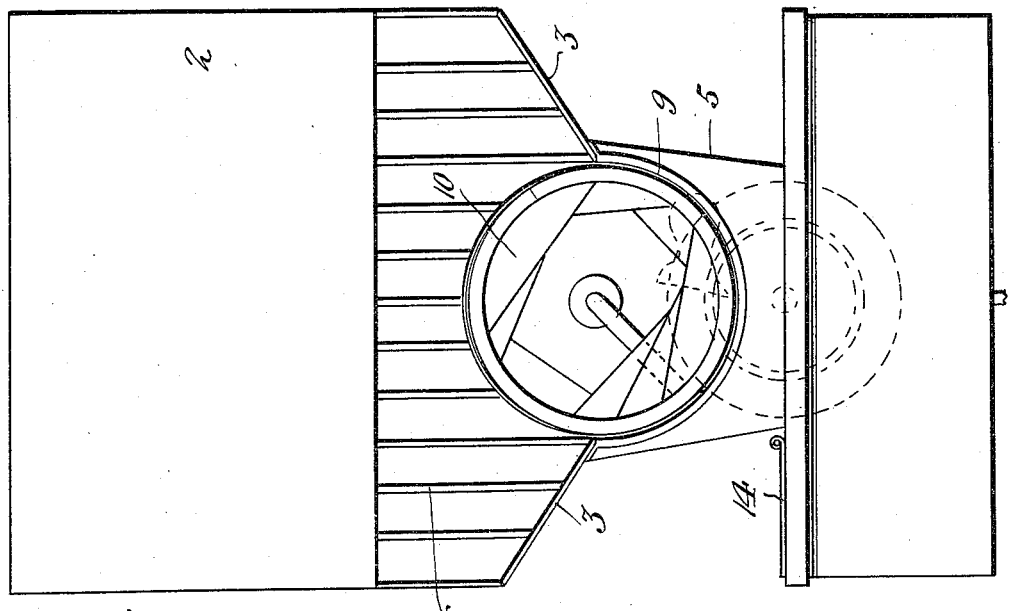
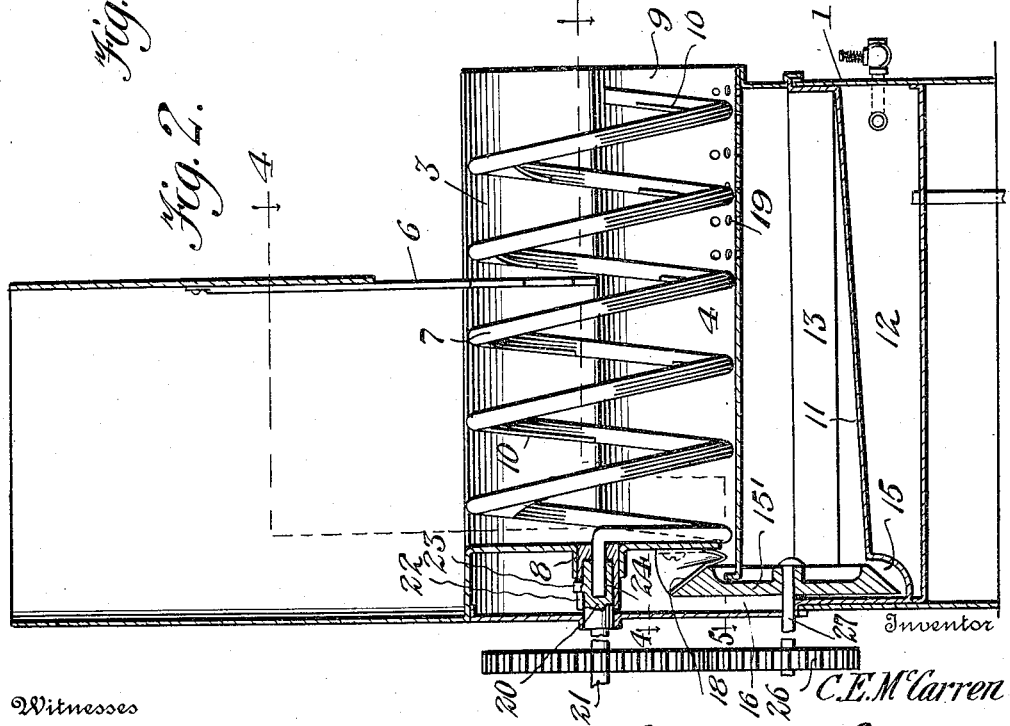

C. E. McCARREN.
POPCORN COATING DEVICE.
APPLICATION FILED MAY 1, 1915.
1,164,948.
Patented Dec. 21, 1915.
2 SHEETS—SHEET 2.
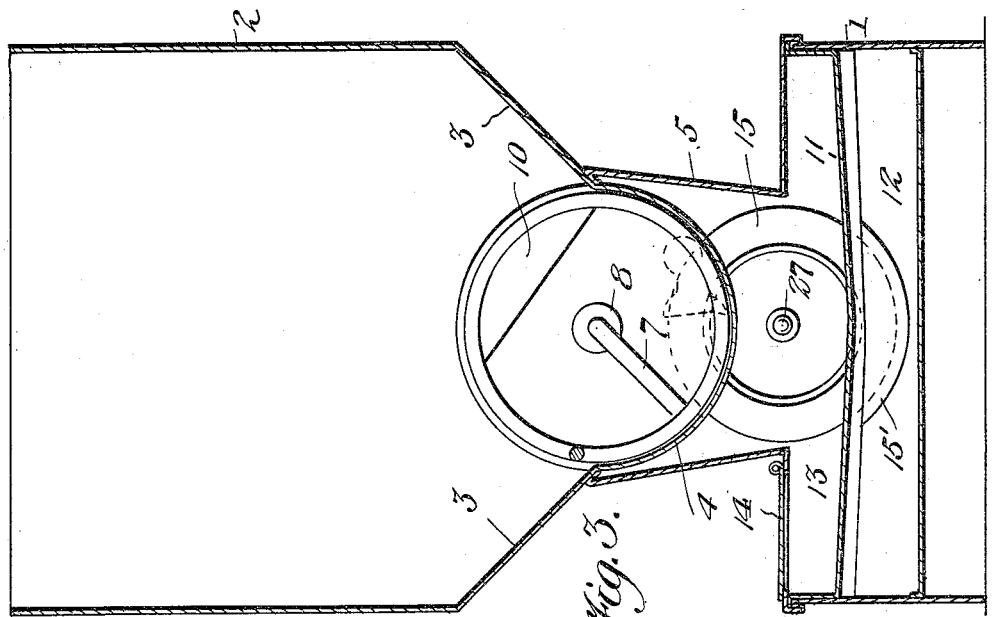
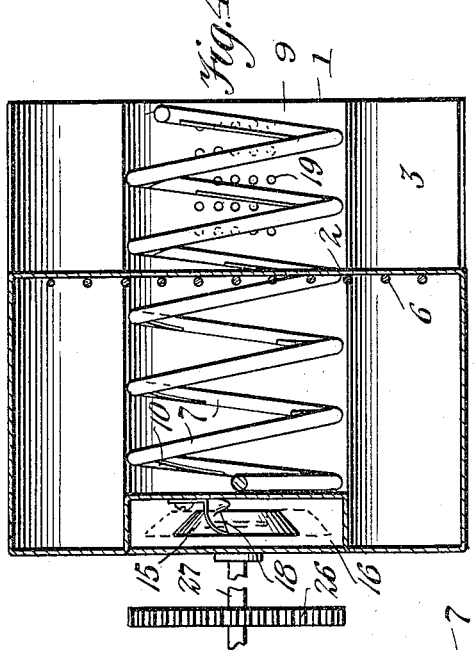
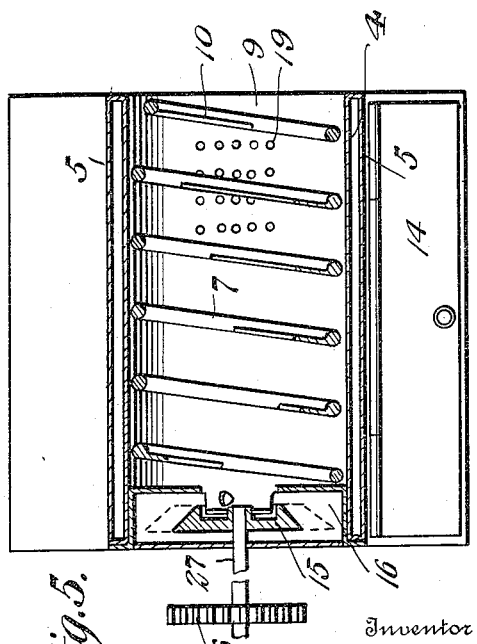
Witness
Inventor
C. E. McCarren
By Victor J. Evans
Attorney

UNITED STATES PATENT OFFICE.

CHARLES E. McCARREN, OF CINCINNATI, OHIO, ASSIGNOR TO SAMUEL S. KINGERY, OF NORWOOD, OHIO.

POPCORN-COATING DEVICE.

1,164,948.     Specification of Letters Patent.     Patented Dec. 21, 1915.

Application filed May 1, 1915. Serial No. 25,228.

*To all whom it may concern:*

Be it known that I, CHARLES E. McCARREN, a citizen of the United States, residing at Cincinnati, in the county of Hamilton and State of Ohio, have invented new and useful Improvements in Popcorn-Coating Devices, of which the following is a specification.

This invention relates to a pop-corn coating device, especially designed and adapted for coating pop-corn with melted butter, although it may be employed for other analogous purposes.

The object of the invention is to provide a device of this character by which the pop-corn may be thoroughly and evenly coated without waste of the butter or other coating material.

A further object of the invention is to provide a device which insures the even and regulated supply of the pop-corn and butter to the coating elements, whereby maximum efficiency is insured.

A further object of the invention is to provide a means whereby the pop-corn will be fed and agitated in such a way as to subject all the particles thereof to coating treatment, as well as to secure a positive feed of the melted butter and the return of any excess butter to the butter reservoir.

The invention consists of the features of construction, combination and arrangement of parts herein fully described and claimed, reference being had to the accompanying drawings in which:—

Figure 1 is an end of the device. Fig. 2 is a vertical longitudinal section of the same. Fig. 3 is a vertical transverse section through the device. Figs. 4 and 5 are sectional plan views taken respectively on the lines 4—4 and 5—5 of Fig. 2. Fig. 6 is a detail perspective view showing the detachable connection between the spiral feeder and transmission shaft.

In carrying my invention into practice, I provide a base support in the form of a receptacle 1, preferably of rectangular or oblong rectangular form. Extending upward mainly from the rear portion of this receptacle is a hopper or chamber 2 to contain the pop-corn. This chamber 2 is provided at its bottom with sloping sides 3 extending at a downward and inward angle of inclination and merging into the sides of a semi-circular or gutter-shaped chute or trough 4. This chute or trough extends beyond the pop-corn reservoir to the opposite end of the receptacle 1, and the sloping sides 3 may continue outward the full length of the chute, as shown.

The hopper and chute are carried by an upright extension 5 from the casing, and the lower front portion of the hopper is open and guarded by a baffle or grating 6, preferably formed of vertical rods of wire, the openings in this grating being of just sufficient size to prevent the pop-corn from coming out at this point and from feeding in too great a quantity to the feed screw or spiral, hereinafter described, in the chute. The pop-corn may be introduced into the hopper 2 in any suitable manner, as by having the top of said hopper open, or by providing it at the top or any other suitable point with a door. Arranged to rotate within the chute 4 and extending above the chute is a feeder or feed screw 7, comprising a spirally coiled rod or wire, carrying at one end a fixed hub or sleeve 8. This spiral feeder is preferably of such a diameter that its lower half will be substantially inclosed in the chute, and has its convolutions spaced a proper distance apart to insure the even and regular feed of the pop-corn toward the forward open or discharge end 9 of the trough. The rotary spiral feeder has its spirals provided with blades 10 conforming in pitch thereto, and in the rotation of the feeder these blades come in contact with the pop-corn and toss and turn over the same, bringing all the particles of pop-corn into contact with each other and also in contact with the melted butter contained in the trough, by which particles of the pop-corn will be coated and the pop-corn at the same time fed forward at a regulated speed and finally discharged through the open end of the trough into a suitable receptacle.

The receptacle 1 is in the form of a double boiler, divided by a horizontal partition 11 into a lower heating chamber 12 and a top butter reservoir or melting chamber 13. The chamber 12 may be heated by steam, hot water or other suitable means, while the chamber 13 is provided with a door 14 for the insertion and removal of the butter and for cleansing and other purposes. As shown, the walls of the chamber 13 are sloped downward and rearwardly and lead to a pit or depression 15 in which is arranged to revolve a butter feed wheel 15′, which dips peripherally at its base in said pit and projects peripherally at its top upward through a slot 16 into the trough or chute 4. This wheel is provided with a beveled surface 17 which takes up the melted butter and brings the same into the path of a spring pressed or spring metal scraper 18 which is arranged to sweep the melted butter from the surface of the feed wheel into the chute, whence it is taken up by the rotary spiral feeder and its blades and the pop-corn and transferred to the latter, the bottom of the chute being provided with drain passages 19 leading back to the butter reservoir whereby all excess butter flows back into said reservoir. The hub or sleeve 8 is adapted to receive a head or clutch member 20 on a shaft 21, and is provided with a bayonet slot 22 to receive a pin or projection 23 on said head 20, which has a socket or recess 24 slidably receiving the end of the spiral feeder to which the hub is fixed, thereby centering the head within the hub. This construction of connection between the feeder and shaft provides a locking connection whereby the feeder may be connected with and disconnected from the shaft by partial rotary and endwise movements, the rotary movement for release being in a direction opposite to the normal direction of rotation of the feeder, as will be readily understood. This connection adapts the feeder to be applied for cleaning and repairs, and to permit cleaning and repairs of the coöperating parts of the machine, in a ready and convenient manner and without disturbing the driving connections. The shaft 21 may be driven from any suitable source of power and carries a gear 25 meshing with a gear 26 on the transmission shaft 27, whereby the latter is driven to operate the butter feed wheel 15′.

It will be understood that a proper supply of butter is placed in the compartment 13 and melted by the heat from the compartment 12, that the pop-corn to be coated is placed in the hopper 2 and that in the operation of the device the pop-corn is fed forward through the action of the rotary spiral feeder, being prevented from feeding too fast by the baffle or grating, and that in passing through the spiral feeder or drum the pop-corn will be revolved with the drum and turned over and agitated by the blades of the drum and thus brought into intimate contact with the melted butter and coated evenly and smoothly with the latter. The buttered pop-corn feeding through the drum discharges into any suitable receptacle at the adjacent end of the device, the excess butter draining back into the butter reservoir, while a constant supply to the trough-shape hopper is being maintained by the feed wheel. It will thus be obvious that a machine is provided which is simple of construction, reliable and economical in operation, and which insures the regular and even coating of the pop-corn without injury to the latter or waste of the butter.

I claim:—

1. A pop corn coating device including a hopper, a chute communicating with the hopper, a feeder operating in the chute, a butter reservoir arranged below the chute, means for heating the same, means for conveying melted butter from said reservoir to the chute, and means for driving the feeder.

2. A pop corn coating device including a hopper, a chute communicating with the hopper, a feeder operating within the chute, a butter reservoir arranged beneath the chute and having a gutter and a sloping surface leading thereto, means for heating said reservoir to melt the butter therein, means for conveying the melted butter from the gutter to the chute, and means for driving the feeder.

3. An apparatus for coating pop corn comprising a hopper, a chute communicating with the hopper, a butter reservoir arranged beneath the chute, said chute being provided with drain passages communicating with the reservoir, means for heating the reservoir to melt the butter therein, means for conveying the melted butter from the reservoir to the chute, and means for driving the feeder.

4. An apparatus for coating pop-corn, comprising a trough-shaped chute, a hopper having sloping walls leading to the chute, said hopper being open at one side, a grating covering the open side of the hopper through which the material is adapted to pass on its feed to the chute, means for supplying a coating substance to the chute, a rotary drum turning in said chute, and spiral blades carried by the drum to act upon the material.

5. An apparatus for coating pop-corn, comprising a butter reservoir, means for melting the butter therein, a trough-shaped chute above and in communication with the butter reservoir, means for taking up the butter from the reservoir and conveying the same to the chute, a reservoir for the pop-corn in communication with the chute, a rotary drum operating in the chute, and blades carried by the drum to act upon the material.

6. A pop-corn coating apparatus comprising a receptacle having a heating chamber and a butter reservoir, a trough-shaped chute having an opening in communication with said reservoir, and said chute having drain openings also communicating with the reservoir, a pop-corn hopper provided with inclined walls leading to the chute and having an open side communicating with the chute, a grating controlling the flow of pop-corn through said open side into the chute, a feed wheel for taking up the butter from the reservoir and conveying it through said opening to the chute, means for removing the butter from said wheel and depositing it in the chute, a rotary drum operating in the chute, and blades carried by said drum to act upon the pop-corn.

7. An apparatus for coating pop corn comprising a hopper, a chute communicating with the hopper, a feeder arranged within the chute, a butter reservoir disposed beneath the hopper, means for heating said reservoir to melt the butter therein, a rotary element for dipping the butter from the reservoir and conveying the same to the chute, and means for driving the feeder and said rotary element.

8. An apparatus for coating pop corn comprising a hopper, a chute communicating with the hopper, a butter reservoir arranged beneath the chute, means for heating the same to melt the butter therein, a rotary element for conveying the melted butter from reservoir to the chute, a wiper for scraping the melted butter from said element, a feeder operating within the chute, and means for driving the rotary element and feeder.

9. A pop corn coating device comprising a hopper, a chute communicating with the hopper, a butter reservoir arranged beneath the chute, said reservoir being provided with a gutter and a sloping surface leading thereto, means for heating said reservoir to melt the butter therein for travel down said sloping surface to said gutter, a rotary element for dipping up the butter from the gutter, and conveying the same to the chute, a wiper for removing the butter from the surface of the rotary element for passage into the chute, a feeder within the chute, and means for driving the rotary element and feeder.

10. An apparatus for coating pop corn, comprising a hopper, a butter reservoir having a gutter at one end and a sloping surface inclining from the opposite end of the reservoir to said gutter, a chute disposed above the reservoir and having drain openings communicating therewith, means for heating the reservoir to melt the butter therein, a rotary spiral feeder within the chute, a rotary element for lifting the butter from the gutter and conveying the same to the chute, and means for driving the feeder and rotary element.

11. An apparatus for coating pop corn including a reservoir for melted butter, means for heating the reservoir to melt the butter therein, a chute disposed above the reservoir, a feeder operating in said chute, a rotary member for dipping the butter from the reservoir and conveying the same to the chute, said member having a beveled surface, a wiper to engage and scrape the butter from said beveled surface, and means for driving the feeder and rotary element.

12. A pop corn coating device including a hopper, a chute communicating therewith, a butter reservoir arranged beneath the chute, means for heating said reservoir to melt the butter therein, a rotary element for conveying the butter from the reservoir to the chute, a drive shaft, a spiral feeder provided with a sleeve having a bayonet-joint connection with said shaft, a shaft carrying the rotary element, and gearing between said shafts.

In testimony whereof I affix my signature in presence of two witnesses.

CHARLES E. McCARREN.

Witnesses:
ARTHUR WOOD,
B. T. ARCHER.